United States Patent
Dufour et al.

(10) Patent No.: US 10,363,536 B2
(45) Date of Patent: Jul. 30, 2019

(54) GELLED COMPOSITION FOR AN ORGANIC MONOLITHIC GEL, USES THEREOF AND PROCESS FOR PREPARING SAME

(71) Applicant: HUTCHINSON, Paris (FR)

(72) Inventors: Bruno Dufour, Champagne sur Seine (FR); Hugo Dorie, Montargis (FR); Philippe Sonntag, Avon (FR)

(73) Assignee: HUTCHINSON, Paris (FR)

( * ) Notice: Subject to any disclaimer, the term of this patent is extended or adjusted under 35 U.S.C. 154(b) by 95 days.

(21) Appl. No.: 15/120,723

(22) PCT Filed: Mar. 4, 2014

(86) PCT No.: PCT/FR2014/050477
§ 371 (c)(1),
(2) Date: Aug. 22, 2016

(87) PCT Pub. No.: WO2015/132475
PCT Pub. Date: Sep. 11, 2015

(65) Prior Publication Data
US 2017/0007975 A1    Jan. 12, 2017

(51) Int. Cl.
| | |
|---|---|
| *C08J 3/075* | (2006.01) |
| *C08G 8/22* | (2006.01) |
| *C08J 9/00* | (2006.01) |
| *B01J 13/00* | (2006.01) |
| *E04B 1/78* | (2006.01) |
| *H01G 11/32* | (2013.01) |
| *C01B 32/05* | (2017.01) |

(52) U.S. Cl.
CPC ....... *B01J 13/0091* (2013.01); *B01J 13/0065* (2013.01); *C01B 32/05* (2017.08); *C08G 8/22* (2013.01); *C08J 3/075* (2013.01); *E04B 1/78* (2013.01); *H01G 11/32* (2013.01); *C08J 2361/12* (2013.01)

(58) Field of Classification Search
CPC .... C08J 2361/12; C08J 3/075; B01J 13/0091; C08G 8/22
See application file for complete search history.

(56) References Cited

U.S. PATENT DOCUMENTS

| | | |
|---|---|---|
| 2012/0020869 A1 | 1/2012 | Scherdel et al. |
| 2015/0267400 A1 | 9/2015 | Hutchinson |

FOREIGN PATENT DOCUMENTS

| | | |
|---|---|---|
| WO | WO 2010/000778 A1 | 1/2010 |
| WO | WO 2014/060906 A1 | 4/2014 |

OTHER PUBLICATIONS

Bruno, M. et al., "A novel way to maintain resorcinol-formaldehyde porosity during drying: Stabilization of the sol-gel nanostructure using a cationic polyelectrolyte", Colloids and Surfaces A: Physicochemical and Engineering Aspects, vol. 362, pp. 28-32, (Jun. 5, 2010).

Bruno, M. et al., "Characterization of monolithic porous carbon prepared from resorcinol/formaldehyde gels with cationic surfactant", Colloids and Surfaces A: Physicochemical and Engineering Aspects, vol. 358, pp. 13-20, (Jun. 5, 2010).

Peikolainen, Anna-Liisa, et al., "Preparation of Low-Density Aerogels from Technical Mixture of Diphenolic Compounds", XP55144451A, (Jan. 1, 2008).

*Primary Examiner* — Kara B Boyle
(74) *Attorney, Agent, or Firm* — Arent Fox LLP

(57) ABSTRACT

The invention relates to a gelled carbon-based composition forming an organic polymeric monolithic gel which is suitable for forming an aerogel by drying, to uses and to a process for preparing this carbon-based composition. The invention applies especially to the production of such gels having a very low density and a very low heat conductivity, a very high specific surface area and a satisfactory compression strength, for their use as thermal superinsulators or as carbon-based electrode precursors of supercondensers.

A composition according to the invention comprises a resin at least partly derived from polyhydroxybenzenes H and from formaldehyde(s) F, said polyhydroxybenzenes comprising at least one unsubstituted polyhydroxybenzene R' and at least one polyhydroxybenzene substituted with one or two alkyl groups.

This composition is such that said polyhydroxybenzenes comprise several said unsubstituted polyhydroxybenzenes R and R' and in that the composition comprises a water-soluble cationic polyelectrolyte P.

13 Claims, No Drawings

GELLED COMPOSITION FOR AN ORGANIC MONOLITHIC GEL, USES THEREOF AND PROCESS FOR PREPARING SAME

CROSS-REFERENCE TO RELATED APPLICATIONS

This application is a National Stage entry of International Application No. PCT/FR2014/050477, filed Mar. 4, 2014. The disclosure of the priority application is incorporated in its entirety herein by reference.

The present invention relates to a gelled carbon-based composition forming an organic polymeric monolithic gel that is capable of forming an aerogel by drying and a porous carbon monolith by pyrolysis of the aerogel, to uses and to a process for preparing this carbon-based composition. The invention applies especially to the production of such organic gels or of such carbon monoliths having a very low heat conductivity and density, and, in contrast, a very high specific surface area and a satisfactory compression strength, for their use as heat superinsulators (i.e. heat conductivity typically less than or equal to 40 $mW \cdot m^{-1} \cdot K^{-1}$ approximately) or as precursors of supercapacitors carbon-based electrodes, in a nonlimiting manner.

Aerogels are porous materials obtained after gelation and then drying of the gel, in which the liquid acting as solvent has been replaced with a gas or a mixture of gases. At very low density (or at high pore volume), these materials are very promising for uses as heat insulators. Specifically, their nanoporosity makes it possible to limit the convection effects of the air contained in the pores.

The preparation of very low density aerogels is, however, complicated on account of their limited mechanical properties, which to date do not allow standard drying in an oven, especially on account of the vaporization of the solvent during this oven drying, which gives rise to internal constraints in the material, destroying its nanostructure and creating macrofissures therein. This is why use is conventionally made of drying with supercritical $CO_2$ for the production of these low-density aerogels. This method gives good results regarding the stability of the nanostructure, but it has the drawback of penalizing the manufacturing cost of the aerogel.

Silica aerogels, which are the ones that have been the most widely studied for applications as heat superinsulators (these aerogels may have heat conductivities of the order of from 0.015 to 0.020 $W \cdot m^{-1} \cdot K^{-1}$), do not escape these findings. Thus, with standard oven drying, these silica gels undergo substantial densification and a loss of their nanostructure. Furthermore, the fissuring of these gels creates fines, which poses toxicity problems due to the release by the powder of silica nanoparticles. Research efforts have thus been concentrated on the spring-back effect of silica aerogels after modification of the chemical nature of their surface, and on replacement of the silanol groups with unreactive groups making it possible to render the densification reversible after evaporative drying.

This principle allowed the industrial production of low-density silica powder in the form of thermal superinsulating nanostructured aerogel, but did not allow the synthesis of a stable monolithic material, in contrast with organic aerogels of high specific surface area, which are, themselves also, promising for uses as thermal superinsulators.

In a known manner, these organic aerogels are typically prepared from a resorcinol-formaldehyde (RF) resin, which has the advantage of being inexpensive and of being able to give a gel used in water and of being able to have various porosity values and density values as a function of the preparation conditions (according to the ratios between reagents R and F and the catalyst, for example). Furthermore, these organic aerogels may be pyrolyzed in the form of carbon with a high specific surface area having the advantage of absorbing infrared radiation, and thus of having a low heat conductivity at high temperature. However, these chemical gels obtained by polycondensation of the precursors are irreversible and therefore cannot be reused. Furthermore, at high conversion, these gels become hydrophobic and precipitate out, which induces mechanical constraints in these materials and increases their fragility.

As for silica aerogels, it is thus necessary, in order to obtain very low density organic monolithic aerogels, to use a drying technique that is mild enough to avoid fracturing or contraction of the nanostructure and a loss of specific surface area for these aerogels. This drying is conventionally performed via solvent exchange with an alcohol, and then via drying using supercritical $CO_2$.

Mention may be made, for example, of document U.S. Pat. No. 4,997,804 for the description of a process for manufacturing such an organic monolithic aerogel based on resorcinol-formaldehyde resin, which uses this drying by solvent exchange and then by supercritical fluid.

As indicated previously, a major drawback of this drying technique is that it is complex to perform and very expensive.

Moreover, it should be noted that a use of such an aerogel as heat insulator necessarily requires high compression strength of this aerogel. Specifically, in the event of an impact on a deformable or fragile aerogel, fractures and/or a loss of porosity may take place, which is accompanied by a loss of heat insulation. It is therefore highly desirable to develop organic aerogels with a high specific surface area which may be obtained via a simple drying method and which also have good compression strength.

The patent application filed by the Applicant under PCT/IB2013/059 208 presents a process for obtaining a thermal superinsulating organic aerogel, e.g. derived from resorcinol and formaldehyde precursors, without exchange of solvent or drying with supercritical fluid, by polymerization in an aqueous solvent of these precursors in the presence of a cationic polyelectrolyte dissolved in this solvent and of a catalyst.

The aerogels obtained via the process described in said document afford satisfactory results. However, the Applicant sought in its recent research to further improve their compression strength, which must be high for certain applications, in particular for materials exposed to high mechanical stresses, and in parallel to reduce the manufacturing cost of these aerogels especially on account of the relatively high price of resorcinol.

The article "Preparation of Low-density Aerogels From Technical Mixture of Diphenolic Compounds" by A. L. Peikolainen et al. teaches of polycondensing at 60° C. formaldehyde with a basic catalyst (KOH) in methanol and a "Honeyol®" mixture (based on alkyl resorcinols and resorcinol), to obtain a low-density aerogel after drying with supercritical $CO_2$.

One drawback of the process described in that article, which is performed with heating in a nonaqueous solvent with this basic catalyst, is that the aerogel obtained does not satisfy the abovementioned criteria of very low heat conductivity and of compression strength that is satisfactory for a thermal superinsulator.

One aim of the present invention is to propose a gelled carbon-based composition forming an organic polymeric monolithic gel that is capable of forming an aerogel by drying and a porous carbon monolith by pyrolysis of said aerogel, which are thermal superinsulators (i.e. with a heat conductivity of less than or equal to 40 mW·m$^{-1}$·K$^{-1}$) which make it possible to overcome the abovementioned drawbacks.

This aim is achieved in that the Applicant has just discovered, surprisingly, that the addition in aqueous phase, to precursors such as unsubstituted polyhydroxybenzenes R and R' and polyhydroxybenzene(s) substituted with one or more alkyl groups and of formaldehyde type, of a particular additive consisting of a water-soluble cationic polyelectrolyte, makes it possible to obtain a solution comprising a resin, which, after gelation to obtain a hydrogel and drying, leads to a thermal superinsulating aerogel which simultaneously has a very low density, a high specific surface area and a satisfactory compression strength under high mechanical stresses, while being able to dispense with drying by solvent exchange and with supercritical fluid.

A gelled carbon-based composition according to the invention, which thus comprises a resin derived at least partly from polyhydroxybenzenes R and H and from formaldehyde(s) F, said polyhydroxybenzenes comprising at least one unsubstituted polyhydroxybenzene R and at least one polyhydroxybenzene substituted with one or more alkyl groups, is such that said polyhydroxybenzenes comprise several said unsubstituted polyhydroxybenzenes R and R' and that the composition comprises a water-soluble cationic polyelectrolyte P.

Advantageously, such a composition according to the invention may have a heat conductivity of less than or equal to 40 mW·m$^{-1}$·K$^{-1}$, and even more advantageously less than or equal to 30 mW·m$^{-1}$·K$^{-1}$.

It will be noted that the compositions of the invention have a reduced manufacturing cost in comparison with those mentioned previously exclusively derived from resorcinol as polyhydroxybenzene precursor.

It will also be noted that an aerogel composition according to the invention, which is based (i.e. predominantly consisting by mass) on this resin and which incorporates this cationic polyelectrolyte, may be advantageously obtained by using oven drying, which is much simpler to perform and less penalizing on the production cost of the gel than drying with supercritical $CO_2$. Specifically, the Applicant has discovered that this additive makes it possible to conserve the high porosity of the gel obtained following this oven drying and that of imparting a very low density combined with a high specific surface area and a high pore volume.

The term "gel" means, in a known manner, the mixture of a colloidal material and of a liquid, which forms spontaneously or under the action of a catalyst by flocculation and coagulation of a colloidal solution.

The term "water-soluble polymer" means a polymer which may be dissolved in water without addition of additives (especially surfactants), in contrast with a water-dispersible polymer, which is capable of forming a dispersion when it is mixed with water.

The terms "in minor amount by mass" and "in major amount by mass" mean in a mass fraction of less than and greater than 50%, respectively.

According to another characteristic of the invention, the composition may comprise the product of a mixing reaction, in an aqueous solvent W:

of a first said unsubstituted polyhydroxybenzene R, and
of a premix H comprising, in minor amount by mass, a second said unsubstituted polyhydroxybenzene R', which is identical to or different from said first unsubstituted polyhydroxybenzene R, and, in major amount by mass, said at least one substituted polyhydroxybenzene.

Preferably, in said product of the mixing reaction, said premix H is present in equal or major molar amount relative to said first unsubstituted polyhydroxybenzene R. In other words, the H/(R+H) mole ratio preferentially satisfies the double inequality 0.5≤H/(R+H)<1, i.e. R/H≤1 or H≥R.

Also preferably, said premix H comprises in a mass fraction of less than 10% said second unsubstituted polyhydroxybenzene R' and, in a mass fraction of greater than 80%, several said substituted polyhydroxybenzenes.

Even more preferably, said first and second unsubstituted polyhydroxybenzenes R and R' are each a resorcinol, and the composition comprises several said substituted polyhydroxybenzenes comprising in major amount by mass methyl resorcinols and in minor amount by mass dimethyl resorcinols and an ethyl resorcinol.

Even more preferentially:
said methyl resorcinols comprise in major amount by mass 5-methyl resorcinol and in minor amount by mass 4-methyl resorcinol and 2-methyl resorcinol,
said dimethyl resorcinols comprise 2,5-dimethyl resorcinol and 4,5-dimethyl resorcinol, and
said ethyl resorcinol is 5-ethyl resorcinol.

Advantageously, the composition may have for said aerogel a density of less than or equal to 0.20 and a compression strength, defined for a compression of a plate formed from said aerogel with a thickness equal to 9 mm according to 50% of said thickness, which is greater than or equal to 0.15 MPa or even 2 MPa.

According to another characteristic of the invention, the composition may comprise the product of a polymerization reaction advantageously at room temperature (i.e. about 22° C.) in an aqueous solvent W of said polyhydroxybenzenes R and H and formaldehyde(s) F, in the presence of said cationic polyelectrolyte P dissolved in the solvent and of a catalyst C that is specifically acidic, this polymerization product comprising the cationic polyelectrolyte P in a very low mass fraction of between 0.2% and 2% (preferably between 0.3% and 1%).

Said at least one polyelectrolyte may be any cationic polyelectrolyte that is fully soluble in water and that has a low ionic strength.

Preferably, it is an organic polymer chosen from the group consisting of quaternary ammonium salts, poly(vinylpyridinium chloride), poly(ethyleneimine), poly(vinylpyridine), poly(allylamine hydrochloride), poly(trimethylammonium ethyl methacrylate chloride), poly(acrylamide-co-dimethylammonium chloride), and mixtures thereof.

Even more preferably, said at least one water-soluble cationic polyelectrolyte P is a salt comprising units derived from a quaternary ammonium chosen from poly(diallyldimethylammonium halides) and is preferably poly(diallyldimethylammonium chloride) or poly(diallyldimethylammonium bromide).

Among the precursor polymers of said resin that may be used in the present invention, mention may be made of polymers resulting from the polycondensation of polyhydroxybenzene monomers that are, respectively, unsubstituted and substituted with one or more alkyl groups and of at least one formaldehyde monomer. This polymerization reaction may involve additional monomers of the polyhydroxybenzene type or otherwise. The polyhydroxybenzenes that may be used are preferentially di- or tri-hydroxybenzenes, and advantageously resorcinol (1,3-dihydroxybenzene) and/or catechol (1,2-dihydroxybenzene), hydroquinone (1,4-dihydroxybenzene) or phloroglucinol (benzene-1,3,5-triol).

Use may be made, for example, of the polyhydroxybenzene(s) R and H and the formaldehyde(s) F in an (R+H)/F mole ratio of between 0.3 and 0.7.

According to another characteristic of the invention, said carbon-based composition may advantageously have a specific surface area of between 400 m$^2$/g and 1200 m$^2$/g, and/or a pore volume of between 0.1 cm$^3$/g and 3 cm$^3$/g, and/or a mean pore diameter of between 3 nm and 30 nm, and/or a density of between 0.04 and 0.4, for example between 0.1 and 0.2.

An organic polymeric monolithic gel according to the invention, such as an aerogel, consists of a carbon-based composition as defined above.

Advantageously, this gel and the carbon monolith obtained via its pyrolysis may have a heat conductivity of between 10 mW·m$^{-1}$·K$^{-1}$ and 40 mW·m$^{-1}$·K$^{-1}$, for example between 20 and 35 mW·m$^{-1}$·K$^{-1}$, this gel being usable for heat insulation of a building or for forming a carbon-based electrode precursor or a supercondenser.

A process according to the invention for preparing a carbon-based composition as defined above forming an aerogel comprises:

a) a polymerization in an aqueous solvent W of said polyhydroxybenzene(s) R and formaldehyde(s) F, in the presence of said at least one cationic polyelectrolyte P dissolved in this solvent and of an acidic catalyst C, to obtain a solution based on said resin, b) gelation of the solution obtained in a) to obtain a gel of said resin, and c) drying of the gel obtained in b) to obtain said organic polymeric monolithic gel.

To obtain the porous carbon monolith, the dried gel obtained in c) is subjected to pyrolysis.

Advantageously, step a) may be performed a1) by dissolving in said aqueous solvent consisting of water said polyhydroxybenzenes R and H and said cationic polyelectrolyte P, which is used in a mass fraction in the composition of between 0.2% and 2%, and then a2) by adding to the solution obtained said formaldehyde(s) F and then said acidic catalyst C.

Also advantageously:

this process of the invention comprises, before step a), a step a0) comprising mixing of a first said unsubstituted polyhydroxybenzene R and of a premix H, said premix H comprises, in minor amount by mass, a second said unsubstituted polyhydroxybenzene that is identical to or different from said first unsubstituted polyhydroxybenzene, and, in major amount by mass, said at least one substituted polyhydroxybenzene, and in step a0), said premix H is used in equal or major amount by mass relative to said first unsubstituted polyhydroxybenzene R.

Preferably, this premix H comprises, in a mass fraction of less than 10%, said second unsubstituted polyhydroxybenzene R', and, in a mass fraction of greater than 80%, several said substituted polyhydroxybenzenes.

Even more preferentially, the first and second unsubstituted polyhydroxybenzenes R and R' are each a resorcinol, and the premix H comprises several said substituted polyhydroxybenzenes comprising:

in a mass fraction of between 60% and 70%, methyl resorcinols which comprise in major amount by mass 5-methyl resorcinol and in minor amount by mass 4-methyl resorcinol and 2-methyl resorcinol, and in a mass fraction of between 20% and 30%:
 dimethyl resorcinols, which comprise 2,5-dimethyl resorcinol and 4,5-dimethyl resorcinol, and
 an ethyl resorcinol, which is 5-ethyl resorcinol.

Advantageously, step c) is performed by drying in humid air, for example in an oven, without solvent exchange or drying with supercritical fluid, to obtain said aerogel.

Advantageously, and as indicated above, step a) may be performed by using said at least one polyelectrolyte P in a mass fraction in the composition of between 0.2% and 2% and preferably between 0.3% and 1%.

As acid catalyst C that may be used in step a), examples that may be mentioned include catalysts such as aqueous solutions of hydrochloric, sulfuric, nitric, acetic, phosphoric, trifluoroacetic, trifluoro-methanesulfonic, perchloric, oxalic, toluenesulfonic, dichloroacetic or formic acid.

In step a), an (R+H)/W mass ratio of said polyhydroxybenzene R and of said premix H relative to the aqueous solvent W which is preferably between 0.001 and 0.07 and for example between 0.01 and 0.05, is used.

It will be noted that this aqueous-phase preparation process according to the invention thus makes it possible to obtain controlled porous structures that vary as a function of the synthetic conditions. It is thus possible to obtain a structure of low density that is solely nanoporous (i.e. with a pore diameter of less than 50 nm), or alternatively with a coexistence between nanopores and macropores (i.e. with a pore diameter of greater than 50 nm).

Other characteristics, advantages and details of the present invention will emerge on reading the description that follows of several implementation examples of the invention, which are given as nonlimiting illustrations in comparison with a "control" example and with an example "not in accordance with the invention".

EXAMPLES OF PREPARATION OF A "CONTROL" AEROGEL G0, OF THREE AEROGELS G1, G2, G3 ACCORDING TO THE INVENTION AND OF AN AEROGEL G4 NOT IN ACCORDANCE WITH THE INVENTION

The examples that follow illustrate the preparation:

of a "control" organic monolithic gel G0 exclusively derived from a resorcinol R as polyhydroxybenzene precursor, like the aerogel obtained in the abovementioned patent application in the name of the Applicant, PCT/IB2013/059 208, of three organic monolithic gels G1 to G3 according to the invention which are each derived from a resorcinol precursor R mixed with a premix H based on resorcinol and on resorcinols substituted with alkyl groups, as polyhydroxybenzene precursors, and of an organic monolithic gel G4 not in accordance with the invention, exclusively derived from this premix H based on resorcinol and on resorcinols substituted with alkyl groups, as polyhydroxybenzene precursors, as in the abovementioned article "Preparation of Low-density Aerogels From Technical Mixture of Diphenolic Compounds" by A. L. Peikolainen et al.

The following starting reagents were used:

resorcinol (R) from Acros Organics, 98% pure,
formaldehyde (F) from Acros Organics, 37% pure,
an acid catalyst (C) consisting of hydrochloric acid,
poly(diallyldimethylammonium chloride) (P), 35% pure (dissolved in water W), and
Honeyol® (H), sold by the company VKG (Viru Keemia Grupp), which is, in a known manner, a premix of resorcinol R' and of alkyl resorcinol derivatives and whose formulation is detailed in table 1 below (the molar mass M of this premix H was determined using the mass fractions of its main ingredients, and a molar mass M of about 121 g/mol$^{-1}$ was thus obtained).

TABLE 1

| Constituents of the premix H named Honeyol ® | Molar mass (g · mol$^{-1}$) | Mass fractions (%) |
|---|---|---|
| methyl resorcinols: | 124 | 64.1 |
| 4-methyl resorcinol | — | 2.8 |
| 5-methyl resorcinol | — | 59.6 |
| 2-methyl resorcinol | — | 1.7 |
| dimethyl resorcinols: | 138 | 16.0 |
| 2,5-dimethyl resorcinol | — | 8.4 |
| 4,5-dimethyl resorcinol | — | 7.6 |
| 5-ethyl resorcinol | 138 | 9.8 |
| resorcinol R' | 110 | 5.7 |
| monohydroxybenzenes | — | 0.8 |
| not identified | — | 3.6 |

These gels G0 to G4 were prepared as follows.

Resorcinol R and/or the premix H (R alone for gel G0 not derived from H, R+H for gels G1, G2, G3 and H alone for gel G4 not derived from R) and also the polyelectrolyte P were, in a first stage, dissolved in a container containing water W. Next, after total dissolution of R and/or H and of P, formaldehyde F was added. Each polymer solution obtained was adjusted to the appropriate pH with the acid catalyst C, it being pointed out that all of these operations were performed at room temperature (at about 22° C.).

In a second stage, each solution obtained was transferred into Teflon® molds, which were then placed in an oven at 90° C. for 24 hours to effect the gelation.

Drying of each hydrogel obtained in a humid chamber at 85° C. with a humidity content of 90% for 24 hours was then performed, followed by drying at 105° C. for 24 hours.

Table 2 below shows the following ratios for each gel G0 to G4, in addition to the pH measured for each polymer solution obtained by adding the catalyst C:

(R+H)/F is the mole ratio of the resorcinol precursor(s) R and/or premix H (with R+H=R for the aerogel G0 and R+H=H for the aerogel G4) on the formaldehyde precursor F, H/(R+H) is the mole ratio of the premix precursor H to the resorcinol precursor(s) R and/or premix H (with H=0 for the aerogel G0 and R=0 for the aerogel G4), (R+H)/W is the mass ratio of the resorcinol precursor(s) R and/or premix H to the water W, and P denotes the mass fraction of the cationic polyelectrolyte in each aerogel composition G0 to G4.

TABLE 2

| Amounts of reagents/process | G0 | G1 | G2 | G3 | G4 |
|---|---|---|---|---|---|
| H/(R + H) | 0 | 0.5 | 0.5 | 0.7 | 1 |
| (R + H)/F | 0.5 | 0.38 | 0.5 | 0.38 | 0.5 |
| (R + H)/W | 0.03 | 0.03 | 0.03 | 0.03 | 0.03 |
| P | 0.4% | 0.4% | 0.4% | 0.4% | 0.4% |
| pH | 1.8 | 1.8 | 1.8 | 1.8 | 1.8 |

As may be seen in table 2, the H/(R+H) mole ratio of the aerogels according to the invention advantageously satisfies $0.5 \leq H/(R+H) < 1$, i.e. H≥R.

Table 3 below collates the densities of the aerogels G0 to G4 obtained, their resistances measured at a relative compression of 50% and their heat conductivities measured at 22° C. (with a Neotim conductimeter) according to the hot wire technique.

The mechanical properties in compression of plates consisting of the aerogels G0 to G4 were measured at 23° C. using a DY35 No. I_62 dynamometer equipped with a 1 kN sensor (I_62_02) at a rate of 5 mm/min, up to a maximum deformation of 50% (i.e. for a maximum compression corresponding to 50% of the initial thickness of each plate). Plates 9 mm thick were used for these measurements, which were cut using a cutter so that they had dimensions of about 13 mm×13 mm. The real dimensions of each plate were measured with a steel ruler for the calculation of the stresses by means of the Testworks software.

TABLE 3

| Properties of the aerogels | G0 | G1 | G2 | G3 | G4 |
|---|---|---|---|---|---|
| Density | 0.08 | 0.11 | 0.12 | 0.18 | — |
| Strength at 50% of compression (MPa) | 0.14 | 0.15 | 0.3 | >2 | — |
| Heat conductivity (mW · m$^{-1}$K$^{-1}$) | 24 | 24 | 26 | 28 | — |

This table 3 shows that the three aerogels according to the invention G1, G2 and G3 prepared from mixtures of resorcinol R and of the premix H containing resorcinol R' and resorcinol derivatives have, firstly, thermal superinsulating properties close to that of the aerogel G0 obtained from resorcinol R alone, and, secondly, a better compression strength than that of this "control" aerogel G0, which makes these aerogels of the invention even better suited to heat insulation in buildings in which they are subjected to high mechanical stresses.

In particular, the gel G3 according to the invention, which is especially characterized by H/(R+H) and (R+H)/F mole ratios of between 0.6 and 0.8 and between 0.30 and 0.45 approximately, respectively, advantageously has simultaneously a low heat conductivity (less than 30 mW·m$^{-1}$K$^{-1}$) and excellent compression strength that is very markedly better than that of the "control" aerogel G0 (see the ratio close to 15 between the respective strengths of G3 and of G0).

It should be noted that the aerogel G4 not in accordance with the invention, due to the fact that it was obtained without resorcinol R, broke on drying and could therefore not be characterized, either as regards its density, its compression strength or its heat conductivity.

It will be noted that the aerogel compositions included in the context of the present invention are not limited to those tested in the three abovementioned examples of gels G1, G2 and G3, but that they may more generally be extended to aerogels derived from a formaldehyde precursor F and from a first unsubstituted polyhydroxybenzene precursor R (e.g. resorcinol or catechol) combined with a premix of a second unsubstituted polyhydroxybenzene precursor R' and of alkyl derivatives thereof.

The invention claimed is:

1. A gelled carbon-based composition forming an organic polymeric monolithic gel which is capable of forming an aerogel by drying and a porous carbon monolith by pyrolysis of said aerogel, wherein the composition comprises a resin derived at least partly from:
a first unsubstituted polyhydroxybenzene,
a premix comprising at least a second unsubstituted polyhydroxybenzene and at least one substituted polyhydroxybenzene substituted with one or more alkyl groups, and
formaldehyde(s),
wherein the composition comprises a water-soluble cationic polyelectrolyte.

2. The gelled composition as claimed in claim 1, characterized in that the composition has a heat conductivity of less than or equal to 40 $mW \cdot m^{-1} \cdot K^{-1}$.

3. The gelled composition as claimed in claim 1, characterized in that the composition comprises a product of a mixing reaction, in an aqueous solvent:
of said first unsubstituted polyhydroxybenzene, and
of said premix comprising:
in minor amount by mass, said second unsubstituted polyhydroxybenzene, which is identical to or different from said first unsubstituted polyhydroxybenzene, and
in major amount by mass, said at least one substituted polyhydroxybenzene.

4. The gelled composition as claimed in claim 1, characterized in that the composition is derived from said premix in equal or major amount by moles relative to said first unsubstituted polyhydroxybenzene, the [premix/(first unsubstituted polyhydroxybenzene+premix)] mole ratio in the composition being greater than or equal to 0.5 and less than 1.

5. The gelled composition as claimed in claim 4, characterized in that said premix comprises, in a mass fraction of less than 10%, said second unsubstituted polyhydroxybenzene, and, in a mass fraction of greater than 80%, at least two said substituted polyhydroxybenzenes.

6. The gelled composition as claimed in claim 3, characterized in that said first and second unsubstituted polyhydroxybenzenes are each a resorcinol, and in that the composition comprises at least two said substituted polyhydroxybenzenes comprising in major amount by mass methyl resorcinols and in minor amount by mass dimethyl resorcinols and an ethyl resorcinol.

7. The gelled composition as claimed in claim 6, characterized in that said methyl resorcinols comprise in major amount by mass 5-methyl resorcinol and in minor amount by mass 4-methyl resorcinol and 2-methyl resorcinol, in that said dimethyl resorcinols comprise 2,5-dimethyl resorcinol and 4,5-dimethyl resorcinol, and in that said ethyl resorcinol is 5-ethyl resorcinol.

8. The gelled composition as claimed in claim 1, characterized in that the composition has for said aerogel a density of less than or equal to 0.20 and a compression strength, defined for compression of a plate formed from said aerogel with a thickness equal to 9 mm along 50% of said thickness, which is greater than or equal to 0.15 MPa, or even 2 MPa.

9. The gelled composition as claimed in claim 1, characterized in that it comprises the product of a polymerization reaction in an aqueous solvent of said polyhydroxybenzenes and formaldehyde(s), in the presence of said cationic polyelectrolyte dissolved in the solvent and of an acid catalyst, the product of the polymerization reaction comprising said cationic polyelectrolyte in a mass fraction of between 0.2% and 2%.

10. The gelled composition as claimed in claim 1, characterized in that said water-soluble cationic polyelectrolyte is an organic polymer chosen from the group consisting of quaternary ammonium salts, poly(vinylpyridinium chloride), poly(ethyleneimine), poly(vinylpyridine), poly(allylamine hydrochloride), poly(trimethylammonium ethylmethacrylate chloride), poly(acrylamide-co-dimethylammonium chloride), and mixtures thereof.

11. The gelled composition as claimed in claim 10, characterized in that said water-soluble cationic polyelectrolyte is a salt comprising units derived from a quaternary ammonium.

12. The gelled composition as claimed in claim 4, characterized in that the [premix/(first unsubstituted polyhydroxybenzene+premix)] mole ratio in the composition is of between 0.6 and 0.8.

13. The gelled composition as claimed in claim 11, characterized in that said water-soluble cationic polyelectrolyte is poly(diallyldimethylammonium chloride) or poly(diallyldimethylammonium bromide).

* * * * *